United States Patent [19]
Walth et al.

[11] Patent Number: 5,738,198
[45] Date of Patent: Apr. 14, 1998

[54] FRICTION ELEMENT FOR USE IN CLUTCHES

[75] Inventors: Ernst Walth; Georg Weidner, both of Bühl, Germany

[73] Assignee: Luk Getriebe-Systeme GmbH, Bühl, Germany

[21] Appl. No.: 375,913

[22] Filed: Jan. 20, 1995

[30] Foreign Application Priority Data

Jan. 21, 1994 [DE] Germany .......................... 44 91 656.5

[51] Int. Cl.$^6$ .............................. F16H 45/02; F16D 13/72
[52] U.S. Cl. .................................. 192/113.36; 192/3.29; 192/107 R
[58] Field of Search ............... 192/113.36, 3.28, 192/3.3, 3.29, 107 R

[56] References Cited

U.S. PATENT DOCUMENTS

| | | | |
|---|---|---|---|
| 2,020,748 | 11/1935 | Waseige | 192/113.36 |
| 3,094,194 | 6/1963 | Kershner | 192/113.36 X |
| 3,198,295 | 8/1965 | Fangman et al. | 192/113.36 X |
| 3,805,935 | 4/1974 | Armstrong | 192/113 A |
| 4,027,758 | 6/1977 | Gustavsson et al. | 192/113.36 |
| 4,969,543 | 11/1990 | Macdonald . | |
| 5,056,631 | 10/1991 | Macdonald . | |

FOREIGN PATENT DOCUMENTS

| | | |
|---|---|---|
| 43 28 182 A 1 | 2/1994 | Germany . |
| 58-30532 | 8/1981 | Japan . |

Primary Examiner—Charles A. Marmor
Assistant Examiner—Saúl Rodriguez
Attorney, Agent, or Firm—Darby & Darby

[57] ABSTRACT

A friction element which can be used in the lockup clutch of a hydrokinetic torque converter and has a friction face engaging a complementary friction face when the clutch is at least partially engaged is provided with one or more channels which are machined, impressed or otherwise formed in its friction face to permit a fluid coolant to flow from a first compartment containing a pressurized fluid into a second compartment wherein the fluid pressure is lower. Each channel includes at least one fluid flow restricting portion which communicates with the first compartment and establishes a turbulent flow of fluid into a major portion of the respective channel. The major portion is designed to establish a laminar flow of fluid toward one or more outlets communicating with the second compartment. The reduction of pressure differential between the fluid in the first compartment and the fluid in the second compartment is effected by the respective fluid flow restricting portion or portions, either entirely or substantially entirely. This ensures a more satisfactory exchange of heat between the fluid in the major portion of each channel and the adjacent parts of the clutch.

8 Claims, 6 Drawing Sheets

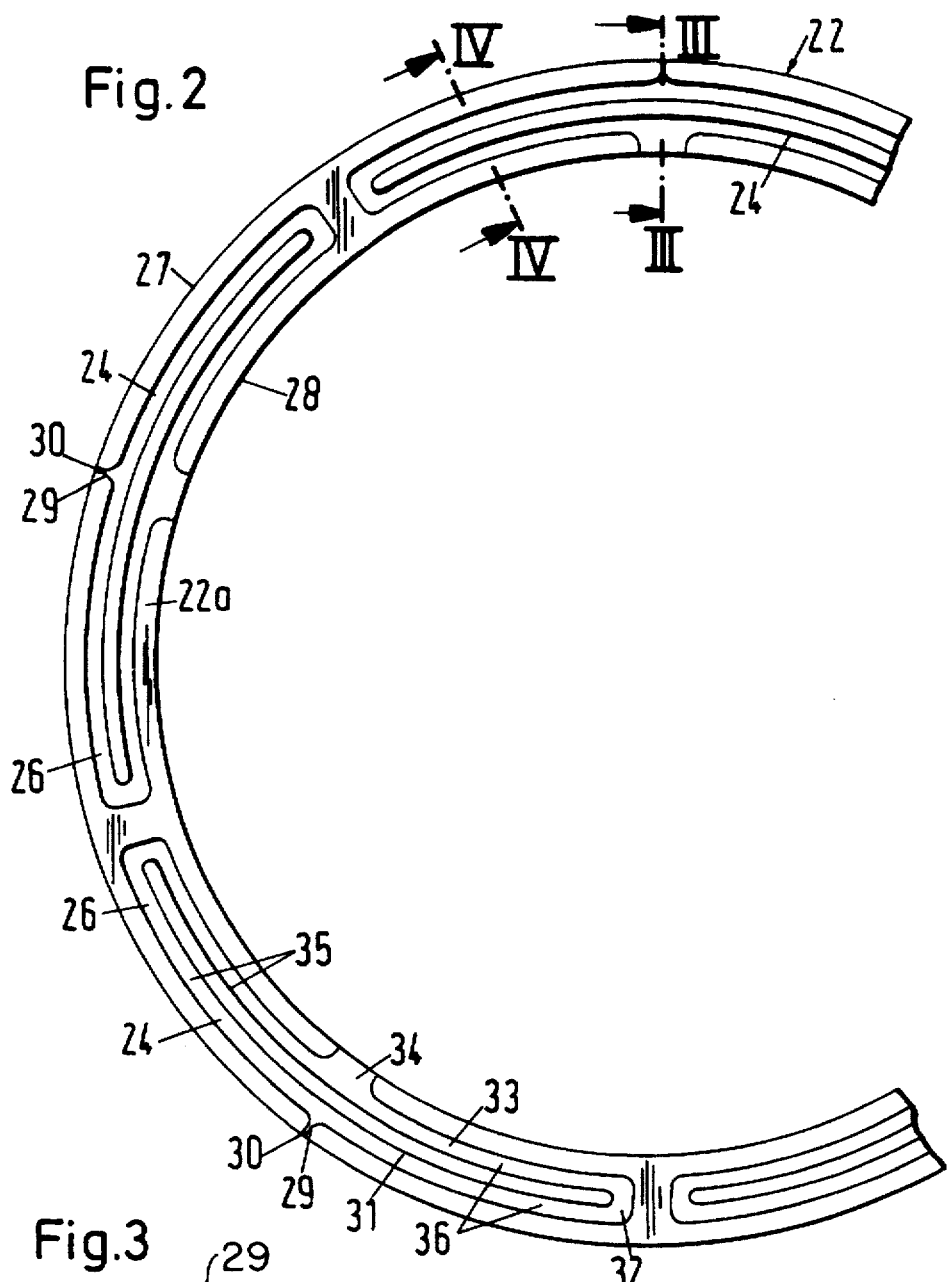
Fig. 2
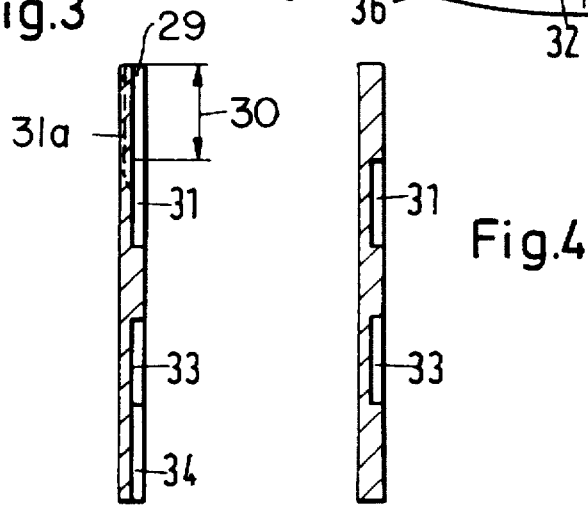
Fig. 3
Fig. 4

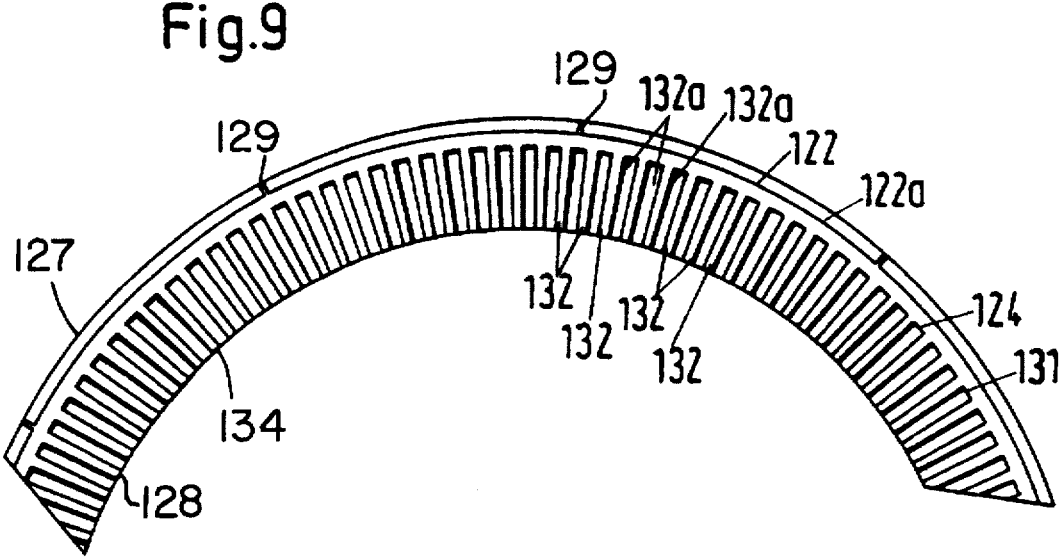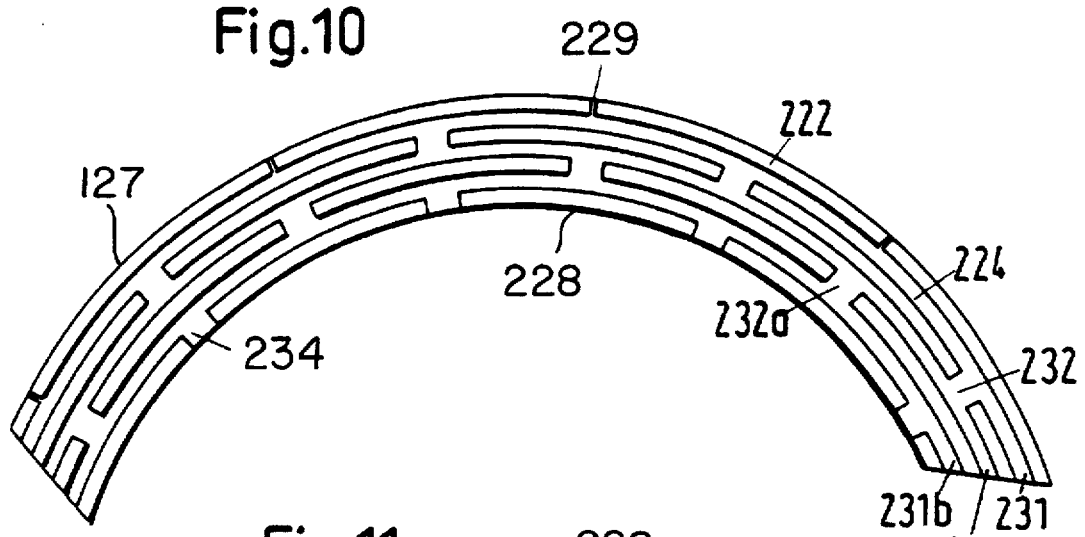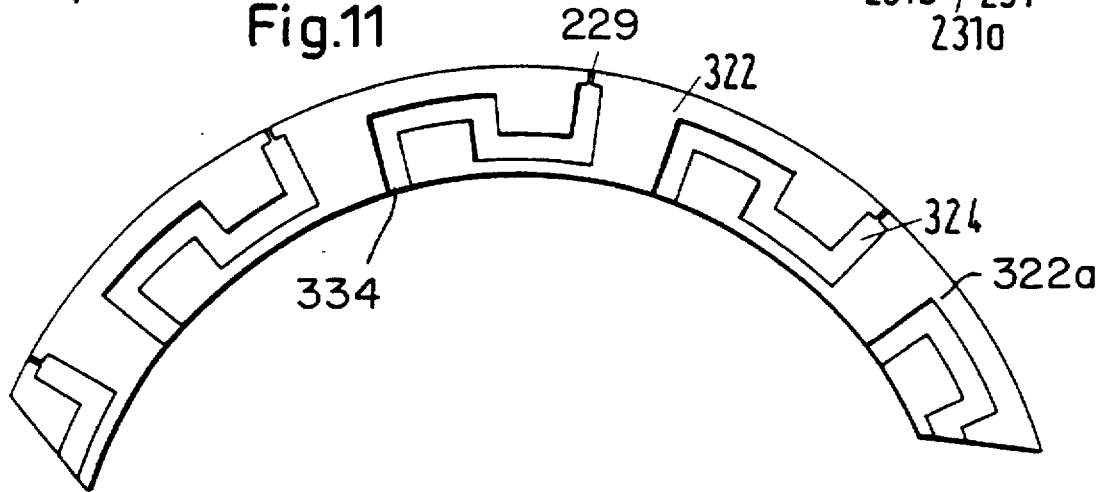

5,738,198

1

FRICTION ELEMENT FOR USE IN CLUTCHES

BACKGROUND OF THE INVENTION

The invention relates to friction generating and friction-operated devices in general, and more particularly to friction rings, friction generating pistons and analogous parts (hereinafter called friction elements) which can be utilized in various types of friction clutches, for example, in so-called lockup clutches or bypass clutches of the character employed in the housings of hydrokinetic torque converters.

It is well known to utilize friction rings, friction linings and analogous friction elements in so-called wet running clutches wherein the friction elements should establish one or more paths for the flow of a cooling fluid (e.g., oil) between compartments, wherein the fluid is maintained at different pressures. To this end, the friction elements have friction faces provided with channels for the flow of fluids between such friction faces and the complementary friction faces that form part of wet running clutches. For example, the axially reciprocable piston of a wet running lockup clutch in a torque converter can be provided with a friction lining constituting a first friction element, and the housing of the torque converter can be provided with a second friction element having a friction face which is contacted by the friction face of the first friction element when the lockup clutch is engaged. At least one of the two friction faces is or can be provided with one or more channels serving to establish one or more paths for the flow of a fluid coolant between the two compartments that form part of the internal chamber of the housing of the hydrokinetic torque converter and that contain bodies of fluid which are maintained at different pressures. Adequate cooling of the friction linings and/or analogous friction elements is particularly important when such friction elements are utilized in lockup clutches of the type wherein one of the friction elements is compelled to turn relative to the other friction element even in the engaged condition of the lockup clutch.

Reference may be had, for example, to U.S. Pat. Nos. 4,969,543 and 5,056,631 which disclose hydrokinetic torque converters with wet running lockup or bypass clutches. Each of these patents discloses lockup clutches wherein the cooperating friction faces are configured in such a way that they permit a coolant to flow between a first compartment containing a fluid at a relatively high pressure and a second compartment containing a body of fluid at a relatively low pressure; such flow of fluid between the two compartments and by way of one or more channels can take place while the lockup clutch is engaged to transmit torque between the rotary housing of the hydrokinetic torque converter and the hub of a turbine in the housing.

A drawback of conventional lockup or bypass clutches and of their friction elements is that they fail to ensure adequate cooling of the components of such friction clutches under all circumstances of use, including the operation of the lockup clutch with a certain amount of slip while the clutch is maintained in the engaged condition. Overheating of component parts of a lockup clutch shortens the useful life of the clutch as well as of the torque converter in which the clutch is put to use.

OBJECTS OF THE INVENTION

An object of the invention is to provide a novel and improved friction element which is constructed and configurated in such a way that it ensures highly predictable and adequate cooling of adjacent component parts of a wet running clutch in which the friction element is put to use.

2

Another object of the invention is to provide one or more novel and improved channels in the friction face of the above-outlined friction element.

A further object of the invention is to provide a friction element which can be used in a wet running clutch to permit adequate flow of a fluid coolant along its friction face in the engaged condition of the clutch.

An additional object of the invention is to establish a highly satisfactory exchange of heat between a fluid coolant and those parts of a wet running clutch which are most likely to be heated when the clutch is in use.

Still another object of the invention is to provide a lockup clutch which embodies one or more improved friction elements and is capable of transmitting pronounced torques in hydrokinetic torque converters or other types of torque transmitting machines or apparatus.

A further object of the invention is to provide a clutch which embodies one or more friction elements of the above-outlined character.

Another object of the invention is to provide a novel and improved piston for use in a wet running clutch.

An additional object of the invention is to provide a novel and improved housing for use in a hydrokinetic torque converter.

Still another object of the invention is to provide a novel and improved combination of a hydrokinetic torque converter and a wet running lockup or bypass clutch.

A further object of the invention is to provide a novel and improved method of regulating the flow of a liquid coolant along the friction surface of a friction ring, a friction lining or an analogous friction element.

Another object of the invention is to provide a novel and improved method of selecting and maintaining an optimal rate and nature of fluid flow along the channelled friction face of a friction element, particularly a friction element which can be put to use in a wet running clutch, such as the bypass clutch or lockup clutch in the housing of a hydrokinetic torque converter for use in the power trains of motor vehicles.

An additional object of the invention is to provide a power train embodying one or more clutches with one or more friction elements of the above-outlined character.

Still another object of the invention is to provide novel and improved methods of providing grooves, channels or analogous passages for the flow of a fluid relative to the friction surface of a friction ring, friction lining or an analogous friction element.

A further object of the invention is to provide a novel friction lining or a novel friction ring.

SUMMARY OF THE INVENTION

One feature of the present invention resides in the provision of a friction element which can be put to use in a clutch, e.g., in a so-called lockup clutch or bypass clutch of a hydrokinetic torque converter. The improved friction element comprises a substantially washer-like friction face having inner an outer annular portions and at least one elongated fluid conveying channel provided in the at least one friction face and extending between the inner and outer annular portions. The at least one channel has at least one fluid flow restricting portion which determines the rate of fluid flow in the at least one channel between the inner and outer annular portions.

The at least one flow restricting portion is or can be configurated and dimensioned to establish a turbulent flow of fluid between its intake and discharge ends. The at least one channel having such flow restricting portion or portions can further include at least one major portion which is configurated and dimensioned to establish a laminar flow of fluid therein.

The at least one fluid flow restricting portion can have a length of between about 2 mm and 8 mm (particularly between about 3 mm and 5 mm) as measured in the longitudinal direction of the at least one channel or in a circumferential direction of the friction face, depending upon the orientation of the at least one major portion relative to the inner and outer annular portions of the friction face.

The at least one major portion of the at least one channel can have a relatively large first cross section, and the at least one flow restricting portion can have a relatively small second cross section. The ratio of the first and second cross sections can be between about three to one and eight to one, particularly between about four to one and six to one.

The at least one flow restricting portion of the at least one channel can constitute a narrow passage having a fluid intake end and a fluid discharge end. Such friction element is or can be provided with surfaces bounding the narrow passage and having sharp edges at the intake end and/or at the discharge end of the passage.

The at least one flow restricting portion of the at least one channel can be provided at the outer annular portion of the friction face.

The at least one channel can include a plurality of flow restricting portions which are spaced apart from each other in the circumferential direction of the friction face and are provided at the outer annular portion of such friction face. This channel can further include at least one major portion which communicates with the plurality of flow restricting portions and has at least one outlet at the inner annular portion of the friction face. The at least one major portion of such channel can further include a plurality of sections extending substantially in the circumferential direction of the friction face. The fluid flow restricting portions can extend substantially radially inwardly from the outer annular portion toward the inner annular portion of the friction face. The aforementioned sections forming part of the at least one major portion can include a first section which communicates with at least one of the plurality of flow restricting portions and a second section which communicates with the at least one outlet. The at least one major portion of such channel can further include at least one intermediate section which extends substantially radially of the inner and outer annular portions and communicates with the first and second sections of the at least one major portion. The sections of the at least one major portion of the at least one channel can be distributed in such a way that they include or form two groups which are at least substantially mirror images of each other with reference to a plane which substantially halves one of the plurality of flow restricting portions and extends substantially radially of the inner and outer annular portions of the friction face. The at least one outlet and one of the plurality of flow restricting portions can be located at least close to a plane which extends substantially radially of the inner and outer annular portions of the friction face.

In accordance with one presently preferred embodiment, the at least one channel can be provided with a plurality of flow restricting portions which are spaced apart from each other in the circumferential direction of the friction face and a plurality of sections each of which communicates with at least one of the flow restricting portions. Alternatively, the at least one channel can have a plurality of substantially zig-zag shaped sections each of which communicates with at least one of the plurality of flow restricting portions.

Regardless of whether the at least one channel includes one or more flow restricting portions, it can include one or more major portions each of which communicates with at least one flow restricting portion and is configurated to repeatedly change the direction of fluid flow between the inner and outer annular portions of the friction face.

The friction face of the improved friction element can include a channel-free part which constitutes between about 40 percent and 70 percent, particularly between about 50 percent and 60 percent, of the friction face.

Each channel can be bounded by a depressed portion of the friction face. Alternatively, at least one channel or each channel can be obtained by removing material from the friction face.

Another feature of the present invention resides in the provision of a novel article of manufacture which is a friction element designed for use in an engageable and disengageable lockup clutch or bypass clutch of a hydrokinetic torque converter including a housing for the clutch, for a turbine, for a pump and (if necessary) for a stator and having a chamber including first and second fluid-containing compartments which are partially separable from each other by a piston forming part of the clutch and having a first friction face engageable with a second friction face of the clutch in response to engagement of the clutch. One of the friction faces is provided on a substantially washer-like part of the improved friction element and has inner and outer annular portions which are respectively disposed at one of the compartments and at the other of the compartments. The friction element further comprises at least one elongated fluid conveying channel provided in the one friction face and extending between the inner and outer annular portions to establish at least one path for the flow of fluid between the compartments in the engaged condition of the clutch. The at least one channel has at least one fluid flow restricting portion which determines the rate of fluid flow between the two compartments along the at least one path.

As a rule, one of the compartments is disposed radially inwardly and the other compartment is located radially outwardly of the one friction face.

When the clutch is engaged, the pressure of fluid in one of the compartments is higher than the fluid pressure in the other compartment. The at least one channel in the one friction face has at least one end portion in communication with the compartment containing fluid at one of the pressures and the at least one flow restricting portion then communicates with the compartment containing fluid at the other pressure so that the fluid flows in the at least one channel between the at least one flow restricting passage and the at least one end portion of the at least one channel in the engaged condition of the lockup clutch. The at least one flow restricting portion has an intake end and a discharge end and is or can be configurated and dimensioned to effect a reduction of the pressure differential between the intake end and the discharge end within a range of between about 60 percent and 80 percent, particularly between about 70 percent and 80 percent. The at least one fluid flow restricting portion can communicate with the compartment containing fluid at the higher pressure.

The at least one channel can be provided in a depressed portion of the one friction surface. Alternatively, the at least one channel can be obtained as a result of removal of material from the substantially washer-like part of the friction element.

The novel features which are considered as characteristic of the invention are set forth in particular in the appended claims.

BRIEF DESCRIPTION OF THE DRAWINGS

The improved friction element itself, both as to its construction and the mode of utilizing the same in a clutch, together with additional features and advantages thereof, will be best understood upon review of the following detailed description of several specific embodiments with reference to the accompanying drawings, wherein:

FIG. 2 is a smaller-scale fragmentary elevational view of a friction element which is utilized in the lockup clutch of FIG. 1;

FIG. 3 is an enlarged fragmentary sectional view of the friction element substantially as seen in the direction of the arrows from the line III—III of FIG. 2;

FIG. 4 is an enlarged fragmentary sectional view substantially as seen in the direction of arrows from the line IV—IV of FIG. 2;

FIG. 9 is a fragmentary elevational view of a friction element with a friction face provided with a system of channels departing from that shown in FIG. 2;

FIG. 10 is a view similar to that of FIGS. 2 and 9, but showing a portion of a friction element with a friction face provided with a system of channels different from those shown in FIGS. 2 and 9; and FIG. 11 is a view similar to those of FIGS. 2, 9 and 10, but showing a different system of channels in the friction face of the friction element.

DESCRIPTION OF PREFERRED EMBODIMENTS

Figure 1:
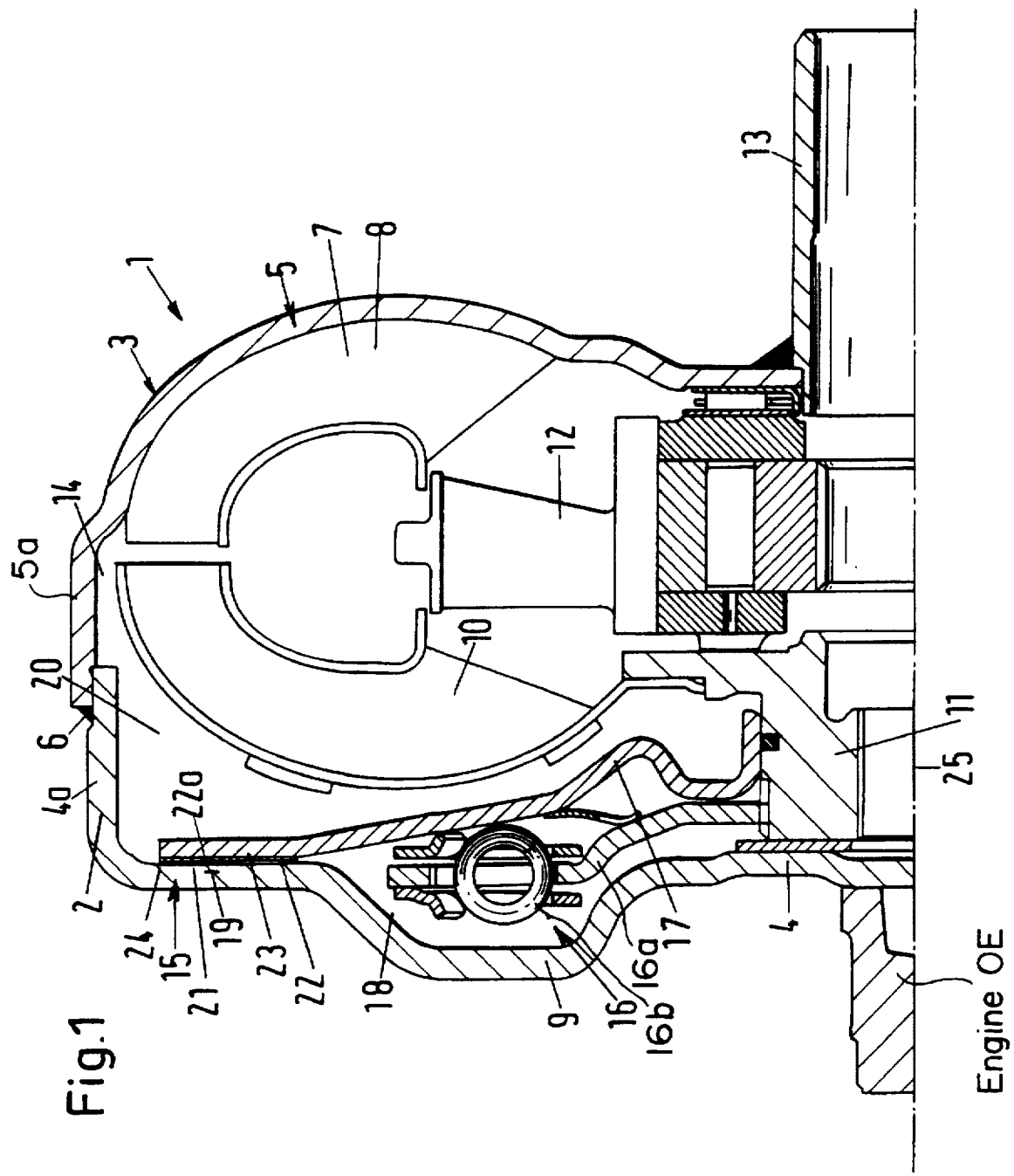
FIG. 1 is a fragmentary axial sectional view of a hydrokinetic torque converter which is combined with a lockup clutch having one or more friction elements embodying one form of the instant invention.

FIG. 1 shows a portion of a torque transmitting apparatus 1 including a hydrokinetic torque converter 3 having a housing 2 for a customary pump 7, a turbine 10, an optional stator 12 and a lockup clutch or bypass clutch 15. The housing 2 includes a first section 4 which can receive torque from the rotary output element OE (e.g., a crankshaft) of a combustion engine and a second section 5 having a tubular central portion 13 adapted to be rotatably mounted in the case of a variable-speed transmission in a motor vehicle. In lieu of being directly coupled to the section 4 of the housing 2, the output element OE of the prime mover can be affixed to a disc-shaped member (not shown) which, in turn is connectable to the housing 2. Reference may be had, for example, to the published Japanese patent application Serial No. 58-30532.

The radially outer portion of the housing section 5 includes a relatively short cylindrical sleeve 5a which is slipped onto a similar sleeve 4a constituting the radially outer portion of the housing section 4. The sleeves 4a and 5a are sealingly and non-rotatably connected to each other by a welded seam 6.

The section 5 of the housing 2 constitutes a part (shell) of the pump 7 which further includes a set of vanes or blades 8 disposed in the internal chamber 14 of the housing 2. The manner in which the vanes 8 are affixed to that part of the pump 7 which is constituted by the housing section 5 forms no part of the present invention.

The turbine 10 is installed in the chamber 14 between the pump 7 and a substantially radially extending wall 9 of the housing section 4. The radially inner portion of the turbine includes a hub 11 having a splined internal surface for transmission of torque to the complementary external surface of a rotary input element (e.g., an externally splined shaft, not shown) of the variable-speed transmission in the power train between the output element OE of the prime mover and one or more wheels of the motor vehicle which is assumed to embody the torque transmitting apparatus of FIG. 1.

The stator 12 constitutes an optional component of the hydrokinetic torque converter 3 and is disposed between the radially inner portions of the pump 7 and turbine 10 as seen in the direction of the common axis 25 of the torque converter 3 and lockup clutch 15. A suitable shaft seal or the like (not shown) is or can be installed between the tubular portion 13 of the housing section 5 and the case of the variable-speed transmission which receives torque from the hub 11 of the turbine 10.

When engaged, the lockup clutch 15 operates in series with the torque converter 3; at such time, the engaged clutch 15 can transmit torque from the housing section 4 directly to the hub 11 of the turbine 10, i.e., to the input element of the transmission or another driven unit in the power train between the output element OE of the prime mover and one or more wheels of the vehicle. The lockup clutch 15 is installed to operate in series with a damper 16. The input element of the damper 16 is the annular piston 17 of the clutch 15 and the output element 16a of the damper has an internal gear in mesh with an external gear of the hub 11. The radially inner portion of the major part of the turbine 10 is in sealing engagement with, but is movable axially of, the hub 11. The output element 16a of the damper 16 is also movable along the hub 11 in the direction of the axis 25. The damper 16 further comprises a set of energy storing elements 16b in the form of coil springs installed between the input and output elements 17, 16a and operating in the circumferential direction of the housing 4 and piston 17.

When the lockup clutch 15 is engaged, its piston 17 divides the chamber 14 into a first compartment 18 located radially inwardly of a washer-like friction lining 22 on the radially outer portion of the piston and a second compartment 20 which is located radially outwardly of the friction lining 22. The reference character 19 denotes the locus of frictional engagement of the friction lining 22 with the adjacent radially extending portion of the wall 9 of the housing section 4 when the clutch 15 is engaged so that it transmits torque from the housing 2 to the hub 11 of the turbine 10. The radially outer part of the turbine 1 0, the vanes 8 of the pump 7 and the stator 12 are installed in the compartment 20 of the chamber 14.

That portion of the radial wall 9 of the housing section 4 which confronts the friction lining 22 of the piston 17 can be said to form part of the lockup clutch 15 and is provided with a friction face 21 which is in contact with the friction face 22a of the friction lining 22 when the clutch 15 is engaged. The friction lining 22 constitutes a friction element, the friction face 22a of which is provided with a system of channels configurated, dimensioned and distributed in accordance with one embodiment of the present invention. The friction lining 22 is bonded or otherwise reliably affixed to the adjacent annular washer-like radially outer portion 23 of the piston 17.

When a hydrokinetic torque converter is installed in the power train between the prime mover and one or more wheels of a motor vehicle, the lockup clutch in the housing of such torque converter is often designed in such a way that its abutting friction faces can slip relative to each other even when the clutch is engaged. This generates substantial amounts of heat which must be dissipated in order to avoid overheating of the piston 17 and its lining 22 and/or the portion of the wall 9 at the locus 19 adjacent the friction face 21 at the inner side of the housing section 4. In many instances, the amounts of energy to be dissipated during certain stages of operation of the lockup clutch can be in the range of several kilowatts. Such situations can develop when a vehicle embodying a torque transmitting apparatus 1 of the type shown in FIG. 1 is used to pull a trailer along mountain roads as well as during changeover between operation of the torque converter with slippage of the lockup clutch and operation while the torque converter is practically bypassed by the lockup clutch. Reference may be had, for example, to German patent application Serial No. P 43 28 182.6 which discloses the purposes and the modes of operation of a hydrokinetic torque converter embodying a lockup clutch or bypass clutch wherein the friction faces of the clutch are permitted to turn relative to each other even when the clutch is engaged.

In order to reduce the likelihood of overheating of the parts at the locus 19 of engagement of the friction faces 21 and 22a forming part of the lockup clutch 15, and to thus reduce the likelihood of permanent damage to one or more parts of the torque converter 3 and its clutch 15 as well as spoilage of fluid (normally oil) in the chamber 14 of the housing 2, at least one of the friction faces 21, 22a is channeled in accordance with a feature of the present invention. FIGS. 2, 3 and 4 show the configuration of a system of discrete channels 24 in the friction face 22a of the friction lining 22 which is affixed to the radially outer portion 23 of the piston 17. The channels 24 are dimensioned and configurated in such a way that they establish several paths for continuous flow of fluid between the compartments 18 and 20 even when the lockup clutch 15 is practically fully engaged so that the face 22a of the friction lining 22 lies flush against the friction face 21 of that portion of the wall 9 which confronts the radially outer portion 23 of the piston 17. The establishment of such paths prevents overheating of the friction lining 22 as well as of the wall 9 in that the heat developing as a result of slippage of the friction faces 21, 22a relative to each other is removed by the continuously flowing hydraulic fluid.

The radially outer ends of the channels 24 communicate with the compartment 20 of the housing chamber 14 radially outwardly of the friction faces 21, 22a and the radially inner ends of such channels communicate with the compartment 18 radially inwardly of the two friction faces. The direction of fluid flow is radially inwardly, i.e., from the compartment 20 into the compartment 18 and in the compartment 18 toward the common axis 25 of the torque converter 3 and the lockup clutch 15 in the housing 2. The heated fluid streams which flow in the compartment 18 toward the axis 25 are caused to enter a pipe and/or one or more passages (not shown) for readmission into the compartment 20, preferably by way of a cooling system and a sump.

FIG. 2 shows that the friction lining 22 constitutes a washer-like part having an outer annular portion 27 and an inner annular portion 28. The discrete channels 24 in the friction face 22a of the friction lining 22 can be said to constitute a composite channel or passage 26 which, in the embodiment of FIGS. 2 to 4, establishes several discrete paths for the flow of fluid coolant between the annular portions 27 and 28. The discrete channels 24 are spaced apart from each other in the circumferential direction of the friction lining 22. The illustrated channels 24 have identical sizes and shapes; however, it is equally within the purview of the invention to provide the friction face 22a and/or the friction face 21 with a system of differently dimensioned, configurated and/or distributed channels as long as the selected channels establish paths for adequate flow of fluid coolant between the compartments 18 and 20 even when the lockup clutch 15 is engaged.

Each of the illustrated discrete channels 24 has at least one fluid flow restricting or throttling portion or orifice 29 which is provided in the friction surface 22a adjacent the radially outer portion 27 and communicates with the compartment 20 when the friction lining 22 is used on the piston 17 of the lockup clutch 15 of FIG. 1. FIG. 2 shows that each of the channels 24 is provided with a single flow restricting portion 29 which is disposed opposite an outlet 34 forming part of a major portion of the respective channel 24. Such major portion includes two elongated arcuate sections 31, 33 extending in the circumferential direction of the friction face 22a to one side of the respective flow restricting portion 29 and two elongated arcuate sections 31, 33 extending circumferentially of the friction face 22a to the other side of the respective portion 29. The arcuate sections 31, 33 of each pair of such arcuate sections are communicatively connected to each other by a discrete substantially radially extending intermediate section 32 which is remote from the respective flow restricting portion 29 (again as seen in the circumferential direction of the friction face 22a). As can be readily seen in FIG. 2, the major portion of each channel 24 includes two groups 35, 36 of intermediate sections, and each group includes two arcuate sections 31, 33 and an intermediate section 32. The group 35 is a mirror image of the respective group 36 with reference to a plane which extends radially of the annular portions 27, 28 and halves the respective flow restricting portion 29 as well as the respective outlet 34. The reference characters 30 denote the lengths of the fluid flow restricting portions 29 as measured in the circumferential direction of the friction face 22a, i.e., longitudinally of the respective elongated channels 24. The sections 32 of the major portion of each channel 24 establish two hairpin shaped portions of the path for the flow of fluid from the compartment 20, into the respective flow restricting portion 29, along the two mirror symmetrical halves 35, 36 of the major portion of the respective channel 24 and into the compartment 18 by way of the corresponding outlet 34.

The dimensions and the configuration of the surfaces bounding the major portion (including the pairs of sections 31, 32, 33) of each channel 24 are selected in such a way that they establish a laminar flow of fluid coolant between the annular portions 27, 28 even if the differential between the pressures of bodies of fluid in the compartments 18 and 20 rises to a maximum value. On the other hand, the dimensions and the configuration of surfaces bounding each flow restricting portion 29 are preferably selected in such a way that they establish a turbulent flow of fluid between the compartment 20 and the arcuate sections 31 of the respective channel 24. Such turbulent flow is established at least while the lockup clutch 15 is at least partially engaged, i.e., while the friction face 22a engages with and receives torque from the friction face 21 on the wall 9 of the housing section 4. Such selection of in part laminar and in part turbulent flow of fluid coolant along the paths defined by the channels 24 in the friction face 22a of the friction lining 22 is in direct contrast to the manner of selecting the flow of fluid coolant in accordance with prior proposals. In heretofore known friction elements, the resistance to the flow of fluid coolant is at least substantially constant all the way between the ends of the channels in the friction face. The channels which are provided in the friction faces of heretofore known friction elements lack the equivalents of the flow restricting portions 29 which are configurated and dimensioned to establish a turbulent flow of fluid coolant between the major portions of the channels and the adjacent compartment in the housing of a hydrokinetic torque converter.

The length 30 of each fluid flow restricting portion 29 is preferably only a small fraction of the overall length of the respective channel, not only as measured along the elongated path for the flow of coolant between a flow restricting portion 29 and the respective outlet 34, but also as measured simply in the circumferential direction of the friction surface 22a. For example, if the diameter of the outer annular portion 27 is in the range of between 180 mm and 260 mm (these are customary dimensions in many types of lockup clutches for use in hydrokinetic torque converters), the length 30 of a flow restricting portion 29 in the circumferential direction of the friction face 22a is or can be between about 2 mm and 8 mm, preferably between about 3 mm and 5 min.

The rate of fluid flow through the major portion of a channel 24 is preferably several times the rate of fluid flow through the respective flow restricting portion 29. Otherwise stated, the cross section of the major portion of a channel 24 is several times the cross section of the respective flow restricting portion 29. For example, the cross section of each section 31, 32, 33 of a channel 24 can be between about three and ten times (preferably between about four and six times) the cross section of the respective flow restricting portion 29. Such selection of the cross sections of different portions of the channels 24 ensures the establishment of a laminar flow or a predominantly laminar flow under any of a number of different circumstances of use of the improved friction element in a lockup clutch or an analogous clutch. This holds true primarily or exclusively for the major portions of the channels 24; as already stated before, the flow restricting portions 29 of the channels 24 are preferably configurated and dimensioned in such a way that they establish or that they can establish a turbulent flow of fluid coolant entering the respective channels from the compartment 20.

A highly satisfactory turbulent flow of fluid coolant in the flow restricting portions 29 of the channels 24 can be arrived at if each portion 29 constitutes a relatively narrow passage bounded by surfaces having sharp edges at the intake and/or at the discharge end of such passage. This is shown in FIG. 3 wherein the discharge end of the illustrated narrow passage-like fluid flow restricting portion 29 is bounded by surfaces which are rounded at the discharge end (where the fluid flows into the major portion of the respective channel 24) but which have sharp or relatively sharp edges at the intake end where the fluid coolant flows from the compartment 20 into the flow restricting portion 29. It is presently preferred to replace the rounded portions of surfaces bounding the discharge end of the illustrated flow restricting portion 29 with sharp or sharper edges to thus further enhance the establishment of a turbulent flow between the compartment 20 and the sections 31 of the major portion of the respective channel 24.

The unchanneled portion of a friction face 22a can constitute between about 35 percent and 70 percent (preferably between about 45 percent and 60 percent) of the entire friction surface between the inner and outer annular portions 28, 27 of the friction lining 22. In the embodiments of FIGS. 2 to 4, the channels 24 jointly occupy approximately 50 percent of the entire friction face 22a.

It is further desirable to select the configuration and the dimensions of each fluid flow restricting portion 29 in such a way that they reduce the pressure differential between the fluid in the compartment 20 adjacent the radially outer portion 27 of the friction lining 22 and the fluid in the compartment 18 adjacent the inner portion 28 of the friction lining by between about 60 percent and 85 percent, most preferably between about 70 percent and 80 percent. Otherwise stated, the pressure of fluid coolant which has entered the sections 31 of the major portions of the channels 24 after having passed through the respective flow restricting portions 29 exceeds the fluid pressure in the compartment 18 only by between about 15 percent and 40 percent, preferably between about 20 percent and 30 percent. In view of such pressure differential reducing action of the flow restricting portions 29, it is presently preferred to position the portions 29 adjacent the outer annular portion 27 of the friction lining 22 so that they can receive pressurized fluid coolant directly from the adjacent compartment 20 of the chamber 14 in the housing 2 of the hydrokinetic torque converter 3.

The positioning of the flow restricting portions 29 adjacent the compartment 20 is desirable and advantageous on the additional ground that the fluid coolant flowing from the portions 29 toward the respective outlets 34 offers a lesser resistance to pronounced frictional engagement of the friction face 22a with the friction face 21 of or on the wall 9 of the housing section 4. This will be readily appreciated by bearing in mind that the flow restricting portions 29 are or can be designed to greatly reduce the pressure differential between the bodies of fluid in the compartments 18 and 20. Thus, the pressure of fluid flowing from the flow restricting portions 29 toward the respective outlets 34 is not much higher than the pressure of fluid in the radially inner compartment 18. In other words, a clutch utilizing the improved friction element or lining 22 can transmit larger torques than heretofore known clutches having friction linings or analogous friction elements provided with channels lacking the equivalents of the flow restricting portions 29 of the channels 24 which are configurated and dimensioned in accordance with the present invention and each of which includes or at least one of which includes a fluid flow restricting portion, preferably at the intake end of the respective channel.

Of course, it is also possible to intentionally provide the fluid flow restricting portion or portions 29 of one or more channels 24 at the radially inner annular portion 28 of the friction lining 22. Such design of one or more channels 24 can be selected if the designer of a lockup clutch desires to limit the maximum torque which is to be transmitted by the clutch in the fully engaged condition thereof. For example, if the pressure differential between the bodies of fluid in the compartments 18 and 20 is maintained (or is to be maintained) at a selected value, the provision of one or more channels 24 with fluid flow restricting portions 29 in direct communication with the compartment 18 can ensure that the maximum torque which the clutch can transmit will not exceed a predetermined value.

Figure 5:
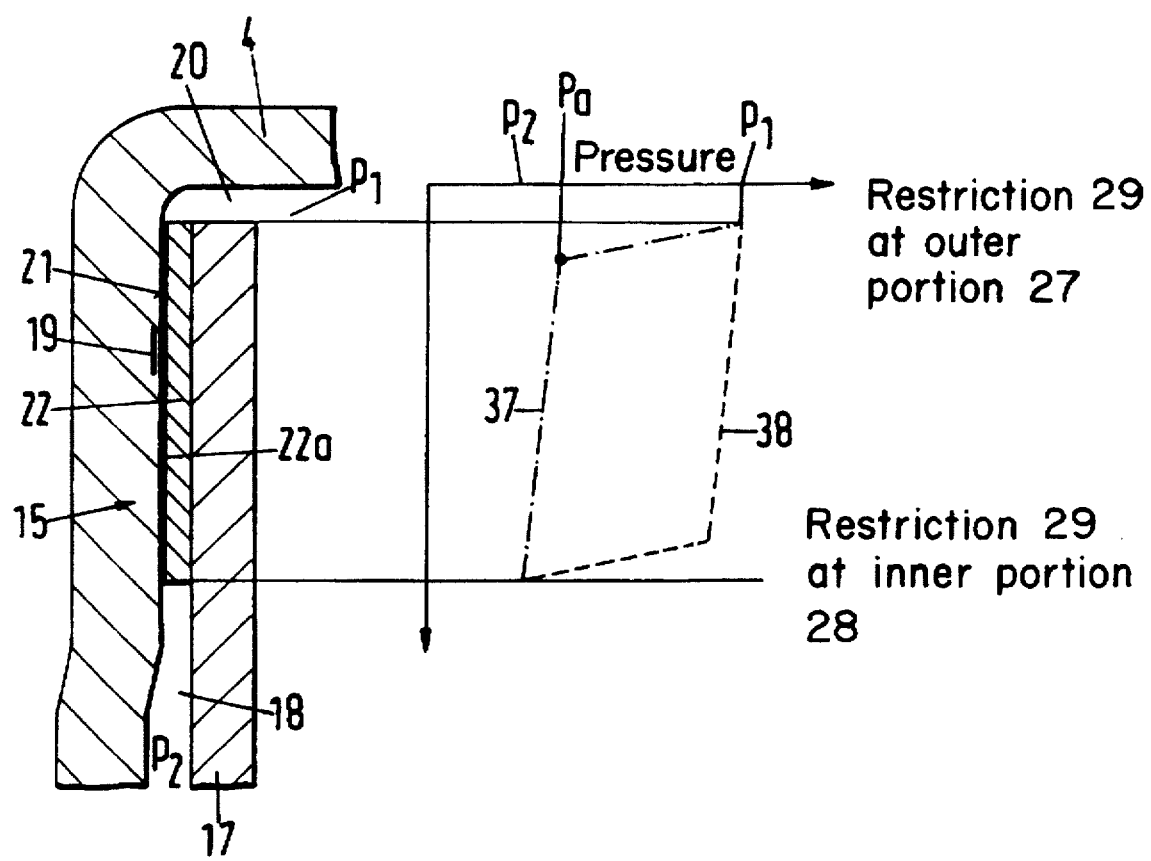
FIG. 5 is an enlarged view of a detail in the lockup clutch of FIG. 1 and shows the distribution of fluid pressures in the region of one of the fluid flow restricting portions forming part of the system of channels in the friction lining on the piston of the lockup clutch.

FIG. 5 illustrates how the selection of the position of a fluid flow restricting channel portion 29 (as seen in the radial direction of the friction lining 22) influences the magnitude of transmitted torque. The left-hand portion of FIG. 5 illustrates portions of those parts of the lockup clutch 15 which are disposed at the locus 19 of frictional engagement between the friction faces 21 and 22a in the engaged condition of the lockup clutch.

The diagram in the right-hand portion of FIG. 5 illustrates various idealized pressure profiles related to the radial positions of the flow restricting portions 29 relative to the friction face 22a, the radially inner compartment 18 and the radially outer compartment 20. If the pressure in the compartment 20 (wherein the pressure of fluid coolant is higher than in the compartment 18) equals $p_1$, and the (lower) pressure of fluid coolant in the compartment 18 equals $p_2$, and if a fluid flow restricting portion 29 is adjacent the outer annular portion 27 of the friction lining 22 (i.e., if the position of the flow restricting portion matches those of the portions 29 shown in FIG. 2), the progress of pressures of fluid flowing from the flow restricting portion 29 toward the outlet 34 at the inner annular portion 28 of the friction lining 22 will correspond to that indicated by the phantom line 37. This curve indicates that the pressure differential between the fluid entering the flow restricting portion 29 and leaving such portion to enter the adjacent sections 31 of the respective channel 24 is reduced to about 80 percent of the difference between the pressures $p_1$ and $p_2$ in the respective compartments 20 and 18. The character Pa denotes the fluid pressure at the discharge end of the flow restricting portion 29, and such pressure is only slightly higher than the pressure $p_2$.

If the flow restricting portion 29 is located at the radially inner annular portion 28 of the friction lining 22 (e.g., at a location corresponding to that of any one of the outlets 34 shown in FIG. 2), the distribution of pressures of fluid flowing from the compartment 20 toward and into the compartment 18 would correspond substantially to that denoted by the broken-line curve 38 in the diagram in the right-hand portion of FIG. 5.

A comparison of the curves 37 and 38 indicates that, if the pressure differential between the fluids in the compartments 18 and 20 is maintained at a given value, the magnitude of torque which a clutch embodying the friction element 22 is capable of transmitting can be readily selected by the simple expedient of shifting the location or locations of one or more flow restricting portions 29 in a direction from the annular portion 27 toward the annular portion 28 or in the opposite direction, i.e., by changing the radial distance between the axis 25 of the clutch and the location or locations of one or more flow restricting portions 29.

If the flow restricting portion or portions 29 are provided at the radially outer annular portion 27 of the friction element 22, it is possible to ensure that the clutch embodying the element 22 will be capable of transmitting torques exceeding those transmittable by heretofore known clutches even though the pressure differentials between the bodies of fluid in the two compartments are the same. By the same token, it is possible to reduce the pressure differential and to transmit the same torque as with a conventional clutch provided that the flow restricting portion or portions 29 are positioned closer to or at the radially outer annular portion 27 of the friction element 22.

Depending on the number and configuration of the fluid flow restricting portions in the friction face (such as 22a) of a friction element (such as 22) embodying the present invention, the width or length (30) of each portion 29 can be in the range of between about 0.4 mm and 2.5 mm, particularly between about 0.5 mm and 1.5 mm. The depth of the flow restricting portion or portions 29 can be in the range of between about 0.2 mm and 1 mm, particularly between about 0.3 mm and 0.7 mm.

The depth of the major portions of the channels 24 (i.e., of the portions including the sections 31, 32 and 33) can be the same all the way from the respective fluid flow restricting portion or portions 29 to the respective outlet or outlets 34. However, it is equally within the purview of the invention to provide channels with main portions including parts having different depths. For example, it is possible to increase the depth of those ends of the sections 31 forming part of one or more channels 24 which are immediately adjacent the respective fluid flow restricting portion or portions 29. This can be seen in FIG. 3 wherein the increased depth of one of the sections 31 communicating with the illustrated flow restricting portion 29 is shown by phantom lines, as at 31a. It is also possible to reduce the width but to increase the depth of one or more flow restricting portions 29 so that the increased depth will exceed that of the adjacent ends of the respective sections 31. Such configuration of one or more flow restricting portions is desirable and advantageous if the manufacturer of friction elements 22 desires to avoid any changes or any pronounced changes of the rate of fluid flow in a portion 29 relative to the major portion(s) in response to progressing wear upon the face 22a of the friction element 22 or an analogous friction element. The wear is uniform or substantially uniform upon the entire unchanneled portion of the friction face 22a so that the ratio of the rates of fluid flow through the portion or portions 29 and the major portion or portions of one or more channels 24 remains at least substantially unchanged.

The flow restricting portion or portions 29 determine the rate of flow of fluid coolant in the respective channel or channels 24, and each such portion 29 is preceded or followed by an elongated major portion of the respective channel 24 which can establish a straight path, a meandering path, a zig-zag shaped path or any other path which ensures the withdrawal of requisite amounts of heat from the parts which are adjacent the friction faces of the engaged or partially engaged clutch. As a rule, the major portion of each channel 24 will be configurated and dimensioned in such a way that it offers little resistance to the flow of fluid coolant therein and brings the conveyed fluid coolant into heat exchanging contact with relatively large surfaces bounding the major portion or portions of one or more channels 24.

Figure 6:
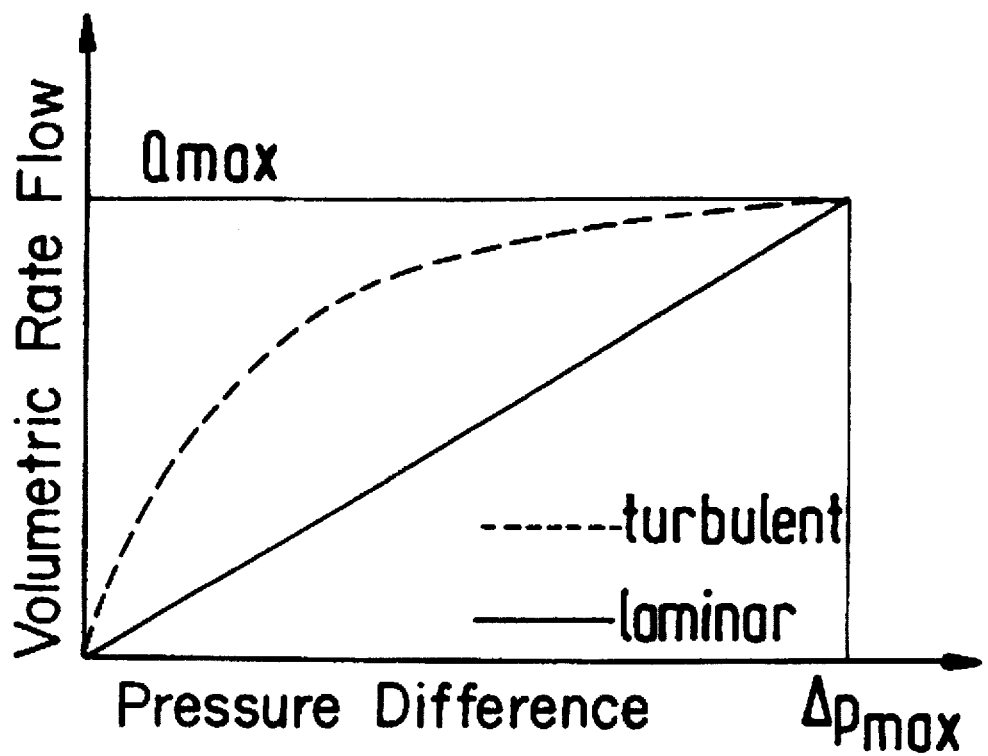
FIG. 6 is a diagram showing the relationship of the pressures of a hydraulic cooling fluid at opposite ends of a fluid flow restricting portion.

In the diagram of FIG. 6, the pressure differential ($p_1 - p_2 = \Delta p$) between the bodies of fluid coolant in the compartments 18 and 20 is measured along the abscissa, and the rate of fluid flow (Q) as a function of the pressure differential is measured along the ordinate. If the flow of fluid coolant along the path defined by a channel 24 is a laminar flow, the relationship between the pressure differential and the rate of fluid flow is a substantially linear relationship as indicated in FIG. 6 by the uninterrupted straight-line curve. The pressure differential $\Delta p$ at a channel 24 is the differential between the pressure of fluid entering the channel and the pressure of fluid leaving the channel. Such laminar throttling takes place if a channel is not provided with a fluid flow restricting portion, i.e., if a channel is configurated and dimensioned in a manner as disclosed in the aforementioned U.S. Pat. Nos. 4,969,543 and 5,056,631. The ratio of laminar throttling (in accordance with prior proposals) amounts to approximately 70 percent of the overall throttling which takes place in the channels of conventional friction elements.

The arcuate dotted-line curve of FIG. 6 denotes the volumetric flow which can be achieved in accordance with the present invention, i.e., by the provision of one or more flow restricting portions which ensure the development of a turbulent flow of fluid coolant. Thus, the volumetric rate of fluid flow as a function of the pressure differential varies substantially in accordance with the progress of a radical function. The variation of volumetric flow as defined by the arcuate dotted-line curve of FIG. 6 can be arrived at by resorting to channels 24 of the type shown in FIGS. 2 to 4. The arcuate dotted-line curve further indicates that a larger volumetric flow of fluid is available when the fluid flow restricting portion or portions establish a turbulent flow and the pressure differential is relatively low than if the channel or channels were designed to establish a laminar throttling or flow restricting action. This is desirable and advantageous if one or more improved friction elements are utilized in a lockup clutch in the housing of a hydrokinetic torque converter. Thus, and referring again to FIG. 1, it is highly desirable to ensure that the rate of fluid flow between the compartments 18 and 20 be rather pronounced, even when the pressure differential between the bodies of fluid coolant in the compartments 18 and 20 is relatively low, because this greatly enhances the cooling action of the fluid flowing in the channels 24, i.e., along the friction face 21 of the wall 9 forming part of the housing section 4.

The channels which are designed to establish volumetric flows (Q) as indicated by the solid-line and broken-line curves of FIG. 6 are further designed to ensure that the two volumetric flows are the same when the pressure differential $\Delta p$ reaches a maximum value ($\Delta p$ max). In a hydrokinetic torque converter wherein a friction element of the lockup clutch is designed in a conventional manner (without an equivalent of one or more flow restricting portions which can establish a turbulent flow of fluid coolant), the maximum pressure differential ($\Delta p$ max) between the bodies of fluid in the two compartments is normally between about 7 bar and 10 bar. However, it is also known to operate with maximum pressure differentials which are above or below the range of between about 7 bar and 10 bar.

Another advantage of the improved friction element is that the rate of fluid flow in the channel or channels (such as the channels 24 shown in FIG. 2) is less dependent upon the temperature. This is due to the fact that the throttling or flow restricting action takes place during the flow of fluid coolant along a relatively short portion of the path between the radially inner and the radially outer annular portions of the friction element 22, i.e., the major part of a reduction of the differential between the pressures of fluid bodies in the compartments 18 and 20 takes place as a result of the influence of the relatively short or extremely short flow restricting portion or portions 29 of each channel 24. As a rule, there develops only a linear transition from the passage constituting a flow restricting portion 29 and the adjacent end or ends of the major part of the respective channel 24. This ensures that the rate of flow is less dependent upon the geometrical tolerances of the channel or channels, i.e., the rate of fluid flow is satisfactory even if the exact dimensions of a channel or of a certain portion of a channel depart from optimum values.

If a friction element is designed in a conventional manner, e.g., in a manner as disclosed in the aforementioned U.S. Pat. Nos. 4,969,543 and 5,056,631, the major part of the throttling or flow restricting action takes place while the flow of fluid coolant is laminar, and the flow restricting action takes place during flow of the fluid coolant along each and every portion of its path between the two compartments. Such throttling action establishes a fourth-power relationship between the depth of the channel and the rate of fluid flow, i.e., the quantity of fluid flowing along its path per unit of time. This, in turn, exhibits the drawback that the rate of fluid flow is strongly influenced by any, even minor, departures of the actual dimensions of a standard channel from the optimum dimensions, i.e., even minor tolerances can bring about highly pronounced changes in the rate of volumetric fluid flow in a conventional channel. Still further, if a standard channel is designed to establish a purely laminar flow of fluid coolant all the way between the compartments containing fluid bodies at different pressures, the rate of fluid flow in such channel is overly dependent upon the viscosity (i.e., upon the temperature) of the conveyed fluid.

The configuration of each flow restricting portion 29 is or can be such that the portion 29 determines at least the major part of the volume of fluid flowing in the respective channel 24 between the compartments 18 and 20 per unit of time. Each flow restricting portion (or at least one flow restricting portion) can constitute a relatively short bore or hole in the inner or outer peripheral surface of the friction element 22. All that counts is to ensure a highly satisfactory exchange of heat between the conveyed fluid and the parts of a clutch which are contacted by the conveyed fluid. This is particularly important when the improved friction element is utilized in a lockup clutch wherein the friction face of or on the piston and the friction face of or on the wall 9 of the housing section 4 are in uninterrupted sliding engagement with each other when the clutch is engaged. It has been found that the improved friction element can ensure adequate cooling of the parts which are adjacent the path for the flow of fluid coolant between the two compartments during each and every stage of operation of a lockup clutch and during each and every stage of operation of the hydrokinetic torque converter which embodies such lockup clutch.

An advantage of channels 24 having one or more flow restricting portions which establish a turbulent flow of fluid coolant therein is that the major part of the pressure differential between the flow restricting portion and the outlet of a channel is reduced at the flow restricting portion but the dynamic losses in the major portion of the channel are very low because the cross-sectional area of each part of the major portion of a channel is or can be much larger than that of the flow restricting portion.

The provision of one or more channels 24 (or analogous channels, e.g., of the character to be described with reference to FIGS. 9, 10 and 11) wherein (in contrast to prior proposals) the flow of fluid coolant is laminar in the major portion of the respective channel but is turbulent during flow through one or more flow restricting passages, is that the rate of volumetric flow is in accordance with a radical function depending upon the pressure of the fluid, i.e., upon the pressure differential between the compartments which are connected to each other by one or more channels having one or more flow restricting portions. Thus, the establishment of a turbulent flow along a relatively short portion of the path for the flow of fluid within a channel which comprises one or more flow restricting portions is more satisfactory, particularly in a hydrokinetic torque converter, because the rate of volumetric fluid flow is higher when the pressure differential is below the maximum permissible value. Reference may be had again to the preceding description of the diagram which is shown in FIG. 6.

The feature that, by properly selecting the length of the flow restricting portions 29 in relation to the overall length of a channel 24, one can compensate for eventual manufacturing tolerances (regarding the depth and/or the width of the channel) as well as for manufacturing tolerances regarding the shape and/or the dimensions of the piston 17 and/or the deformation of the piston in actual use, brings about the important advantage that the friction element (such as 22) and/or the parts which are adjacent the friction face 22a can be mass produced at a lower cost. This is due to the fact that the aforementioned tolerances and/or deformations in actual use of the clutch do not unduly affect the rate of fluid flow in the channels 24, i.e., between the compartments 18 and 20.

As a rule, or at least in many instances, the fluid coolant which is utilized in a hydrokinetic torque converter is oil. Since the viscosity of oil decreases in response to increasing temperature, the improved friction element with one or more channels having one or more flow restricting portions exhibits the additional advantage that the rate of volumetric flow in such channels increases in response to decreasing viscosity of the fluid, i.e., the intensity of cooling action increases at the time when such increase is most desirable because the temperature of the fluid is higher. Of course, such compensation for decreasing viscosity of the fluid coolant should be maintained within certain limits in order to prevent the development of an excessive rate of fluid flow from the higher-pressure compartment into the lower-pressure compartment such as could prevent the establishment and maintenance of requisite fluid pressure in the clutch closing or engaging compartment of the hydrokinetic torque converter.

The feature which was already discussed in connection with FIG. 3, namely that the flow restricting portion 29 of a channel 24 can constitute a relatively narrow and a relatively deep short passage bounded by surfaces which have sharp or relatively sharp edges at the intake end and/or at the discharge end of the passage, exhibits the important advantage that the resistance which a portion 29 offers to the flow of fluid therein is a linear function of the width and depth of the passage. In conventional friction elements wherein the channel or channels are designed to establish a laminar fluid flow all the way between the inlet and the outlet, the resistance to the flow of fluid in each such channel is a fourth-power function of the hydraulic radius or diameter. Therefore, the resistance which a conventional channel offers to the flow of fluid coolant therein is greatly influenced by the machining tolerances, i.e., by departures of the dimensions of conventional channels from ideal dimensions.

As shown in FIG. 2, the distribution of channels 24 in the friction face 22a of the friction element 22 can be selected in such a way that the radially outer annular portion 27 of the element 22 is at least substantially uninterrupted, i.e., that such annular portion is interrupted only by the relatively narrow fluid flow restricting portions 29 of the channels 24. The flow restricting portions 29 can extend substantially radially of the annular portions 27, 28 or the direction of fluid flow therein can be inclined relative to planes which include the axis 25 of the hydrokinetic torque converter 3. As already mentioned above, the cross section of the major portion of each channel 24 can be several times the cross section of the respective flow restricting portion 29; this ensures that the resistance which the fluid coolant encounters during flow along the longer portion of the path defined by a channel 24 is but a fraction of the resistance which the fluid coolant encounters during flow through the respective flow restricting portion or portions 29. In other words, the major part of resistance which the fluid encounters during flow from the compartment 20 toward and into the compartment 18 is offered by the respective flow restricting portion or portions 29. This brings about the additional advantage (already mentioned hereinbefore) that the magnitude of the closing or engaging force furnished by the lockup clutch 15 can be increased because the pressure of fluid flowing within the major portion of each channel 24 is only slightly above the fluid pressure in the compartment 18, i.e., the fluid filling the major portion of each channel 24 does not offer a highly pronounced resistance to engagement of the friction face 22a of the friction element or lining 22 with the friction face 21 of the adjacent portion of the wall 9 forming part of the housing section 4.

In order to ensure that the novel channels can perform their intended functions, it is important to ensure that the friction face 22a of the friction element 22 bear against the friction face 21 of the wall 9 when the lockup clutch 15 is engaged. In other words, it is desirable and advantageous to ensure that the parts 9 and 22 cannot establish between themselves a pronounced clearance (e.g., a clearance having a width in the range of more than 0.03 mm and preferably not exceeding 0.01 mm) when the channels 24 are supposed to influence the flow of fluid coolant therein in a manner as described above with reference to FIGS. 1 to 6. A clearance is likely to develop when the friction face 22a is not exactly parallel to the friction face 21. It has been found that, in the apparatus 1 of FIG. 1, satisfactory regulation of the flow of fluid coolant in the improved channels 24 can be more reliably ensured if the channels 24 are provided at least in that friction face (22a) which is carried by the axially movable piston 17. The reasons will be explained with reference to FIGS. 7 and 8.

Figure 7:
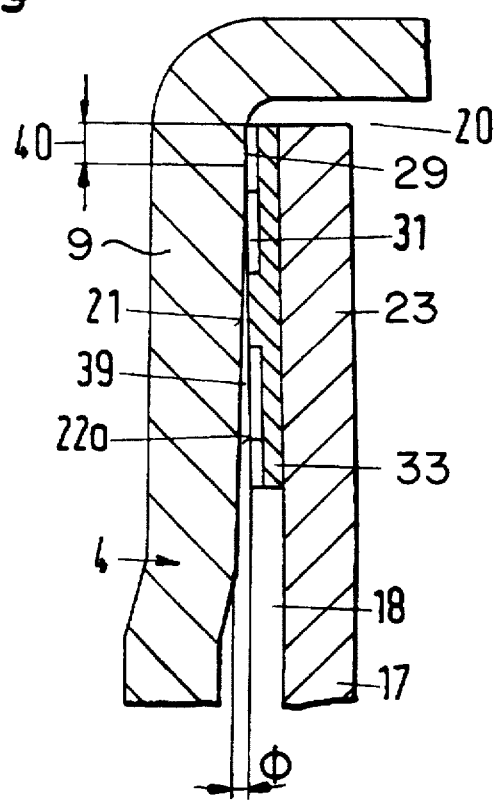
FIG. 7 is a fragmentary sectional view similar to that of FIG. 5 and showing the piston of the lockup clutch in a position it assumes when the clutch is disengaged.

FIG. 7 shows a portion of the hydrokinetic torque converter 3 and of the lockup clutch 15 at the locus of contact between the friction faces 21 and 22a when the clutch 15 is disengaged. The piston 17 of the lockup clutch 15 assumes the position of FIG. 7 when the lockup clutch is at least partially disengaged and when the pressures of the bodies of fluid coolant in the compartments 18 and 20 are the same or the pressure in the compartment 20 only slightly exceeds the pressure in the compartment 18. At such time, the inclination of the radially outer portion 23 of the piston 17 relative to the wall 9 of the housing section 4 is such that the friction faces 21 and 22a are inclined relative to each other and define a relatively small wedge-like angle phi in the range of between 0.5° and 3°, normally close to about 1°.

Figure 8:
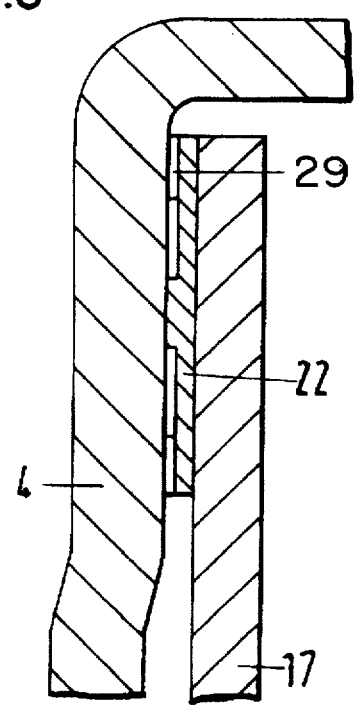
FIG. 8 shows the structure of FIG. 7 but with the piston in a position it assumes when the clutch is engaged.

FIG. 8 shows the piston 17 in a position it assumes when the lockup clutch 15 is engaged, namely when the pressure of fluid coolant in the compartment 20 exceeds the fluid pressure in the compartment 18 by a preselected value. For example, the pressure differential can be between about 4 bar and 8 bar. The resiliency or temporary deformability of the piston 17 will determine the magnitude of the differential between the pressures of the fluid bodies in the compartments 18 and 20. Otherwise stated, the resiliency of the piston 17 will depend upon the desired maximum pressure differential between the compartments 18 and 20.

When the clutch 15 of FIGS. 7 and 8 is disengaged or is only partially engaged as shown in FIG. 7 (i.e., when the pressure differential between the compartments 18 and 20 is zero or close to zero), only the radially outermost part of the friction face 22a of the friction element 22 on the annular portion 23 of the piston 17 contacts the adjacent portion of the friction face 21. The width of the area of contact between the radially outermost portions of the friction faces 21 and 22a is shown at 40. Such width can suffice to ensure that those portions of the friction face 22a which flank the fluid flow restricting portions 29 of the channels 24 are in contact with the friction face 21. This ensures that the novel channels can perform their desirable function even when the lockup clutch 15 is not fully engaged. Thus, even the establishment of a relatively small pressure differential between the compartments 18 and 20 suffices to enable the flow restricting portions 29 to establish a turbulent fluid flow from the compartment 20 into the major portions of the respective channels. For example, the pressure differential need not exceed 1 bar.

As the pressure differential between the compartments 18 and 20 increases, the radially outer portion 23 of the piston 17 undergoes a progressive deformation in a direction toward the orientation of FIG. 8. Thus, the area of contact between the friction faces 21 and 22a grows gradually toward full contact of the friction face 21 with the non-channelled portion of the friction face 22a. In other words, the magnitude of the angle phi gradually decreases to zero. The flow restricting portions 29 of the channels 24 continue to perform their desirable function, i.e., to establish a turbulent flow of fluid therein and to greatly reduce the pressure differential between their fluid receiving and fluid discharging ends.

A comparison of FIGS. 7 and 8 indicates that the flow restricting portions 29 of the channels 24 are preferably positioned in such a way that they can influence the flow of fluid coolant therethrough even if the friction face 21 is not in full sealing engagement with the unchanneled portion of the friction face 22a. In other words, such orientation of the piston portion, 23 and the wall 9 relative to each other that the friction faces 21, 22a establish a clearance or gap 39 (angle phi in FIG. 7) need not prevent the flow restricting portions 29 of the channels 24 from desirably influencing the flow of fluid coolant from the compartment 20 into the major portions of the channels 24. The fact that the fluid which has passed through the flow restricting portions 29 into the major portions of the respective channels 24 is free to overflow between the major portions of neighboring channels 24 (due to the provision of the clearance or gap 39 denoted by the angle phi) is of no consequence because the major part of the reduction of pressure differential between the compartments 18 and 20 is effected by the fluid flow restricting portions 29 and not by the major portions (including the sections 31, 32 and 33) of the channels.

It is presently preferred to provide the improved friction element or elements with channels having relatively deep fluid flow restricting portions 29 as well as relatively deep major portions. This ensures that manufacturing tolerances and/or the setting of the friction element (namely a reduction of its thickness due to repeated forcible frictional engagement with and disengagement from the friction face 21) as well as the wear upon the friction face 22a do not adversely influence the resistance to the flow of fluid coolant which is expected from the improved friction element.

The paths for the flow of fluid coolant between the compartments 18 and 20 by way of the improved channels 24 (or analogous channels) are preferably configurated in such a way that the friction element 22 does not establish any dead corners for stagnant fluid. In other words, the entire fluid stream which enters the major portion of a channel 24 by way of the respective flow restricting portion 29 should remain in continuous motion all the way from the portion 29 to the respective outlet 34.

The length of a fluid flow restricting portion 29 can be between about 2 mm and 8 mm, preferably between about 3 mm and 5 mm.

The ratio of the cross section of the major portion of a channel 24 to the cross section of the respective flow restricting portion 29 can be between about three to one and eight to one, preferably between about four to one and six to one. However, such ranges can be exceeded (upwardly and/or downwardly) when necessary in connection with the design and/or the mode of operation of a particular clutch which employs one or more friction elements embodying the present invention.

FIG. 2 shows a circumferentially complete one-piece washer-like friction element 22. However, it is equally within the purview of the invention to employ a composite friction element, e.g., an element which is assembled of two or more arcuate sections; each such section can be provided with one or more channels 24 and/or analogous channels.

FIG. 9 illustrates a portion of a modified friction element 122, e.g., a friction lining which can be utilized in lieu of the friction lining 22 in the lockup clutch 15 of FIG. 1. The friction face 122a of the element 122 is provided with a single channel 124 having several circumferentially spaced-apart equidistant or substantially equidistant flow restricting portions 129 at the outer annular portion 127, and a major portion including a circumferentially complete annular section 131 adjacent to but spaced apart from the annular portion 127 by a distance corresponding to the length of portion 129 (as measured radially of the annular portions 127 and 128). The major portion of the channel 124 further comprises a plurality of sections 132, each of which has a radially outer end in communication with the ring-shaped section 131 and a radially inner end constituting an outlet 134 into the adjacent radially inner compartment 18 if the friction element 122 is used in lieu of the friction element 22 shown in FIG. 1.

The flow restricting portions 129 determine the major part of the rate of fluid flow from the outer annular portion 127 toward the outlets 134 in the inner annular portion 128 of the friction element 122. Again, the cross section of each section of the major portion of the channel 124 considerably exceeds (and is or can be several times) that of a flow restricting portion 129. As a rule, the portions 129 establish a turbulent flow and the major portion (131, 132) of the channel 124 establishes a laminar or substantially laminar flow of fluid coolant therein. The velocity of fluid flow in the passages which constitute the flow restricting portions 129 of the channel 124 is much higher than in the sections 131, 132 of the major portion of the channel 124. This enhances the transfer of heat between the fluid in the major portion of the channel 124 and the adjacent parts (such as the friction element 122, the piston 17 and the wall 9) if the element 122 replaces the friction element 22 of FIG. 1.

The friction face 122a of the friction element 122 of FIG. 9 includes the narrow circular portion between the annular portion 127 and the section 131 as well as the radially extending lands 132a between neighboring radially extending sections 132 of the major portion of the channel 124. The circular portion of the friction face 122a between the annular portion 127 and the section 1 31 is interrupted by the flow restricting portions 129 so that it comprises a circular array of arcuate parts, the number of which depends upon the number of flow restricting portion 129.

It is clear that the friction face 122a of the element 122 can be provided with two or more discrete (separate) channels each of which can constitute a portion of the illustrated channel 124. For example, if the element 122 is assembled of two or more arcuate components, each such component can be provided with a channel having one or more flow restricting portions 129 and one or more outlets 134, e.g., a discrete outlet for each radially extending section 132.

The friction element 222 of FIG. 10 comprises a channel 224 having a plurality of circumferentially spaced apart fluid flow restricting portions 229 each of which extends substantially radially inwardly from the outer annular portion 227 of the friction element, and a major portion including three circumferentially extending ring-shaped sections 231, 231a, 231b and a plurality of substantially radially extending sections 232, 232a between the sections 231, 231a and 231a, 231b, respectively. The sections 232 are staggered with reference to the sections 232a as seen in the circumferential direction of the element 222. The outlets of the channel 224 are shown at 234; each such outlet can be aligned with a section 232a, as seen in the radial direction of the annular portions 227 and 228. The channel 224 establishes several meandering paths for the flow of fluid from the flow restricting portions 229 toward the outlets 234. In other words, the channel 224 establishes a plurality of paths which are configurated in such a way that a fluid stream flowing from a flow restricting portion 229 toward one or more outlets 234 is caused to repeatedly change the direction of its flow. The functions and the dimensions of flow restricting portions 229 and of the major portion of the channel 224 are or can be the same as those of the portions 29 and major portions of the channels 24 and/or those of the portions 129 and major portion of the channel 124.

The channels 324 in the friction face 322a of the friction element 322 of FIG. 11 differ from the channels 24, 124 and 224 in that they establish substantially S-shaped or zig-zag shaped paths for the flow of fluid from the respective fluid flow restricting portions 329 to the respective outlets 334. The channels 324 in the friction face 322a of the element 322 are also capable of ensuring a highly satisfactory exchange of heat between the conveyed fluid streams and the adjacent portions of a clutch.

The channels 24, 124, 224 and/or 324 can be obtained as a result of removal of material from the friction face of the respective friction element. Alternatively, the channels can be impressed into the friction face by resorting to an imprinting, embossing, punching, stamping or other material deforming or displacing operation.

Referring again to FIG. 1, the friction element 22 can be omitted if the channels 24 are provided directly in the radially outer portion 23 of the piston 17 so that the thus channeled portion 23 comes in direct contact with the friction face 21 when the lockup clutch 15 is engaged.

Still further, it is possible to provide channels 24 and/or analogous channels directly in the friction face 21 of the wall 9 forming part of the housing section 4 shown in FIG. 1. Moreover, the channeled friction lining or element 22 can be provided on the wall 9 and an unchanneled friction lining can replace the friction lining 22, i.e., such unchanneled friction lining can be bonded or otherwise affixed to the radially outer portion 23 of the piston 17. The channel or channels can be provided in a material of the type often employed for the making of friction linings for use on the clutch discs or clutch plates of friction clutches. Alternatively, and as already mentioned above, the channels can be machined into or otherwise provided in the friction face of a metallic friction element such as the radially outer portion 23 of the piston 17 or the adjacent portion of the wall 9 shown in FIG. 1. It is equally possible to provide the channels in one face of a lamination which is thereupon affixed to the piston 17 or to the wall 9. Reference may be had to the aforediscussed prior publications. Still further, it is possible to employ two channeled friction elements analogous to friction linings on the clutch disc or clutch plate of a friction clutch of the type often utilized in motor vehicles.

The channel or channels can be machined into or otherwise formed in the friction face of a friction lining or another suitable friction element during the making or during the finishing of such friction element. For example, the channels 24 can be provided in the face 22a of the friction element 22 before the latter is bonded or otherwise affixed to the radially outer portion 23 of the piston 17. However, it is also possible to impress or to otherwise form the channels 24 during or subsequent to bonding of the friction element 22 to the portion 23 of the piston 17. Referring to FIG. 2, the friction element 22 can be secured to the piston portion 23 in a first step (e.g., by bonding) and the channels 24 can be provided in the friction face 22a of the element 22 during such bonding or upon completion of the bonding operation. The making of the channels 24 and/or analogous channels can be effected by resorting to a suitably profiled die plate or another profiling tool.

The improved friction element is susceptible of numerous additional modifications without departing from the spirit of the invention. For example, the features of the friction element 22 can be combined with some or all of the features of the element 122, 222 and/or 322 or vice versa. Certain further modifications can involve the provision of different numbers of channels, different numbers of flow restricting portions, different configurations and/or different lengths, widths and/or depths of the major portion(s) of the channel or channels, different distribution of the fluid flow restricting portions and/or outlets of the channels, and/or changes in the ratio of channeled and unchanneled portions of the friction face on a friction element.

Additional features of the invention reside in the utilization of one or more improved friction elements in a clutch, the utilization of one or more friction elements in a lockup clutch or bypass clutch, in the utilization of one or more improved friction elements in a hydrokinetic torque converter, in the combination of a piston and an improved friction element, in the combination of a housing with the improved friction element, and in the provision of a combination of any other part with the improved friction element.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. As a novel article of manufacture, a friction element for use in an engageable and disengageable lockup clutch of a hydrokinetic torque converter including a housing for said clutch, for a turbine and for a pump and having a chamber including first and second fluid-containing compartments partially separable from each other by a piston forming part of the lockup clutch and having a first friction face engageable with a second friction face of the clutch in response to engagement of the clutch, said housing and said piston being rotatable about a common axis and one of said compartments being disposed radially inwardly of said friction faces, one of said friction faces being provided on a substantially washer-like part of the friction element and having inner and outer annular portions, said friction element further having at least one elongated fluid conveying channel provided in said one friction face and extending between said annular portions to establish at least one path for the flow of fluid between said compartments in the engaged condition of said clutch, said at least one channel having at least one fluid flow restricting portion which determines the rate of fluid flow between said compartments along said at least one path.

2. The friction element of claim 1, wherein the other of said compartments is disposed radially inwardly and radially outwardly of said one friction face.

3. The friction element of claim 1 for use in a clutch in a housing wherein the pressure of fluid in one of said compartments is higher than the pressure of fluid in the other of said compartments in the engaged condition of the clutch, wherein said at least one channel has at least one end portion in communication with the compartment containing fluid at one of said pressures and said at least one flow restricting portion communicates with the compartment containing fluid at the other of said pressures so that the fluid flows in said at least one channel between said at least one flow restricting passage and said at least one end portion of said at least one channel in the engaged condition of the clutch.

4. The friction element of claim 3, wherein said at least one flow restricting portion has an intake end and a discharge end and is configured and dimensioned to effect a reduction of the pressure differential between said intake end and said discharge end within a range of between about 60 percent and 80 percent.

5. The friction element of claim 4, wherein said range is between about 70 percent and 80 percent.

6. The friction element of claim 3, wherein said at least one flow restricting portion communicates with the compartment containing fluid at the higher pressure.

7. The friction element of claim 1, wherein said at least one channel is provided in a depressed portion of said friction element.

8. The friction element of claim 1, wherein said at least one channel is obtained as a result of removal of material from said friction element.

* * * * *